United States Patent
Coffin

(10) Patent No.: US 9,249,685 B2
(45) Date of Patent: Feb. 2, 2016

(54) FAN DRIVE GEAR SYSTEM ASSEMBLY GUIDE

(71) Applicant: United Technologies Corporation, Hartford, CT (US)

(72) Inventor: James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 660 days.

(21) Appl. No.: 13/716,265

(22) Filed: Dec. 17, 2012

(65) Prior Publication Data

US 2014/0165762 A1  Jun. 19, 2014

(51) Int. Cl.
*F01D 25/18* (2006.01)
*B23P 15/14* (2006.01)
*F16H 57/04* (2010.01)

(52) U.S. Cl.
CPC ............... *F01D 25/18* (2013.01); *B23P 15/14* (2013.01); *F16H 57/0423* (2013.01); *F16H 57/0471* (2013.01); *F16H 57/0486* (2013.01); *Y10T 29/49465* (2015.01); *Y10T 74/19991* (2015.01)

(58) Field of Classification Search
CPC ....... F01D 25/16; F01D 25/164; F01D 25/18; F05D 2260/40311; F05D 2260/98; F05D 2240/50; F04D 29/056; F04D 29/063; F16H 57/0423; F16H 57/0471; F16H 57/0486; Y10T 29/49465
See application file for complete search history.

(56) References Cited

U.S. PATENT DOCUMENTS

| | | | |
|---|---|---|---|
| 4,649,772 A | 3/1987 | Daniel et al. | |
| 4,760,757 A | 8/1988 | Svab | |
| 5,800,302 A | 9/1998 | Werre | |
| 8,777,793 B2 * | 7/2014 | Sheridan | F01D 25/16 475/160 |
| 2006/0223664 A1 | 10/2006 | Duong et al. | |
| 2008/0098713 A1 | 5/2008 | Orlando et al. | |
| 2012/0192570 A1 | 8/2012 | McCune et al. | |
| 2012/0260623 A1 | 10/2012 | McCune et al. | |
| 2012/0263578 A1 * | 10/2012 | Davis | F02C 3/113 415/122.1 |
| 2014/0294558 A1 * | 10/2014 | Haugh | F02C 7/14 415/1 |

OTHER PUBLICATIONS

International Search Report and Written Opinion for International Application No. PCT/US2013/075258 completed on Apr. 4, 2014.
International Preliminary Report on Patentability for International Application No. PCT/US2013/075258 mailed Jul. 2, 2015.

* cited by examiner

*Primary Examiner* — Richard Edgar
*Assistant Examiner* — Juan G Flores
(74) *Attorney, Agent, or Firm* — Carlson, Gaskey & Olds, PC

(57) ABSTRACT

A gas turbine engine has a fan and a turbine section including a turbine rotor to drive the fan through a gear reduction module. An input shaft downstream of the turbine rotor includes a flexible mount driving the gear reduction. The input shaft is mounted within a bearing module. The gear reduction module has static structure mounted to an engine housing through a flexible mount. Oil is supplied into the gear reduction. An oil tube supplies oil from the gear reduction to the bearing module, and is received within openings in the static structure, and a housing for the bearing module. The oil tube extends through an assembly guide having a guide opening spaced away from an outer periphery of the oil tube. The guide opening is intermediate the openings. A method is also disclosed.

14 Claims, 5 Drawing Sheets

FAN DRIVE GEAR SYSTEM ASSEMBLY GUIDE

BACKGROUND

This application relates to a guide which assists in a blind assembly of a fan drive gear to a bearing module, and in particular to the alignment of an oil tube between the two.

Gas turbine engines are known, and typically include a fan delivering air into a compressor. The air is compressed, and delivered into a combustion section where it is mixed with fuel and ignited. Products of this combustion pass downstream over turbine rotors driving them to rotate.

Historically, at least two turbine rotors have been provided, and at least two compressor rotors have been provided. A first turbine rotor drives a higher pressure compressor rotor. A second turbine rotor has historically driven a lower pressure compressor rotor and the fan. These three components have all rotated at a common speed.

More recently, a gear reduction module has been positioned to drive the fan. This has allowed the fan to rotate at a slower speed than the low pressure compressor, which has many beneficial results.

However, assembling the gear reduction module into the gas turbine engine has raised many challenges.

In particular, the method of mounting the gear reduction module into the gas turbine engine includes bringing the gear reduction module in as an assembled unit, and mounting it within the gas turbine engine. The gear reduction module has been mounted through a flexible mount. A convolute is provided in an inner drive shaft as part of the flexible mount, and a flexure flange has been provided as part of the mounting of the gear reduction module into a bearing module.

A bearing module supports the drive shaft. An oil tube is mounted into one of the two modules (gear reduction and bearing), the two are assembled together, and the oil tube must be moved into the other.

However, the oil tube must be capable of pivoting movement within the mount orifices in both the gear reduction module and the bearing module. This is because the flexible mounting of the gear reduction module may result in large deflections of the two modules relative to each other. These deflections may occur during assembly of the modules as well as during normal engine operation.

Since the oil tube is free to pivot, it is difficult to predict its orientation when the gear reduction module is assembled to the bearing module. This problem is complicated, since the assembly is typically "blind."

SUMMARY

In a featured embodiment, a gas turbine engine has a fan, and a turbine section including a turbine rotor to drive the fan through a gear reduction. An input shaft is downstream of the turbine rotor including a flexible mount driving the gear reduction. The input shaft is mounted within a bearing module, which has static structure mounted to an engine housing through a flexible mount. An oil supply system supplies oil into the gear reduction module. An oil tube supplies oil from the gear reduction module to the bearing module. The oil tube is received within an opening in the static structure, and in an opening in a housing for the bearing module. The oil tube extends through an assembly guide having a guide opening spaced away from an outer periphery of the oil tube. The guide opening is intermediate the opening in the static structure, and the opening in the bearing housing.

In another embodiment according to the previous embodiment, the assembly guide is mounted to the gear reduction module.

In another embodiment according to any of the previous embodiments, the opening in the static structure, and the opening in the bearing housing both having a chamfer leading into the openings to allow the tube to pivot within each opening.

In another embodiment according to any of the previous embodiments, the tube is provided with resilient seals at an outer periphery to allow the tube to pivot within the openings in the static structure and the bearing housing.

In another embodiment according to any of the previous embodiments, the guide opening is sized to be spaced from the outer periphery of the oil tube by an amount that will limit any pivoting movement of the oil tube such that it will be aligned with a portion of the chamfer into one of the openings in the static structure and the bearing housing to which it is being assembled.

In another embodiment according to any of the previous embodiments, the turbine section drives a pair of turbine rotors. There is a pair of compressor rotors, a first compressor rotor positioned downstream of the fan, and a second compressor rotor positioned downstream of the first compressor rotor. A first turbine rotor is positioned downstream of a second turbine rotor. The first turbine rotor drives the first compressor rotor, and drives the fan through the input shaft.

In another embodiment according to any of the previous embodiments, the static structure is in a gear reduction carrier.

In another featured embodiment, a method of assembling a gear reduction module to a bearing module includes the steps of providing a gear reduction module having a gear for rotating on a central axis, and a static structure mounting the gear. The static structure is attached to an engine housing through a flexible mount. There is an input shaft to drive the gear through a flexible mount. The input shaft is supported in a bearing module, and provides an oil supply tube from the gear reduction module to supply oil to the bearing module. The static structure and the bearing module are each provided with an opening to secure the oil tube, and provide one of the gear reduction and the bearing module with an assembly guide. The assembly guide has a guide opening which is spaced away from an outer periphery of the oil tube, but limits pivoting movement of the oil tube. An oil tube is inserted into the opening in one of the static structure and the bearing module, and passes the oil tube through the guide opening. The input shaft is attached within the sun gear, and moves the oil tube into the opening in the other of the static structure and the bearing module.

In another embodiment according to the previous embodiment, the assembly guide is mounted as part of the gear reduction module.

In another embodiment according to any of the previous embodiments, the assembly guide is mounted to a flexible mount for flexibly mounting the static structure within the engine housing.

In another embodiment according to any of the previous embodiments, the opening in the static structure, and the opening in the bearing housing both have a chamfer leading into the openings to allow the tube to pivot within each opening.

In another embodiment according to any of the previous embodiments, the guide opening is sized to be spaced from the outer periphery of the oil tube by an amount which will limit any pivoting movement of the oil tube such that it will be aligned with a portion of the chamfer into one of the openings in the static structure and the bearing housing after inserting the oil tube into the opening in one of the static structure and the bearing module, and passing the oil tube through the guide opening, and as attaching the input shaft within the sun gear, and moving the oil tube into the opening in the other of the static structure and the bearing module begins.

In another embodiment according to any of the previous embodiments, the turbine section drives a pair of turbine rotors. There is a pair of compressor rotors. A first compressor rotor is positioned downstream of the fan, and a second compressor rotor is positioned downstream of the first compressor rotor. A first turbine rotor is positioned downstream of a second turbine rotor. The first turbine rotor drives the first compressor rotor, and drives the fan through the input shaft.

In another embodiment according to any of the previous embodiments, the static structure is in a gear reduction carrier.

These and other features of this application will be best understood from the following specification and drawings, the following of which is a brief description.

DETAILED DESCRIPTION

Figure 1:
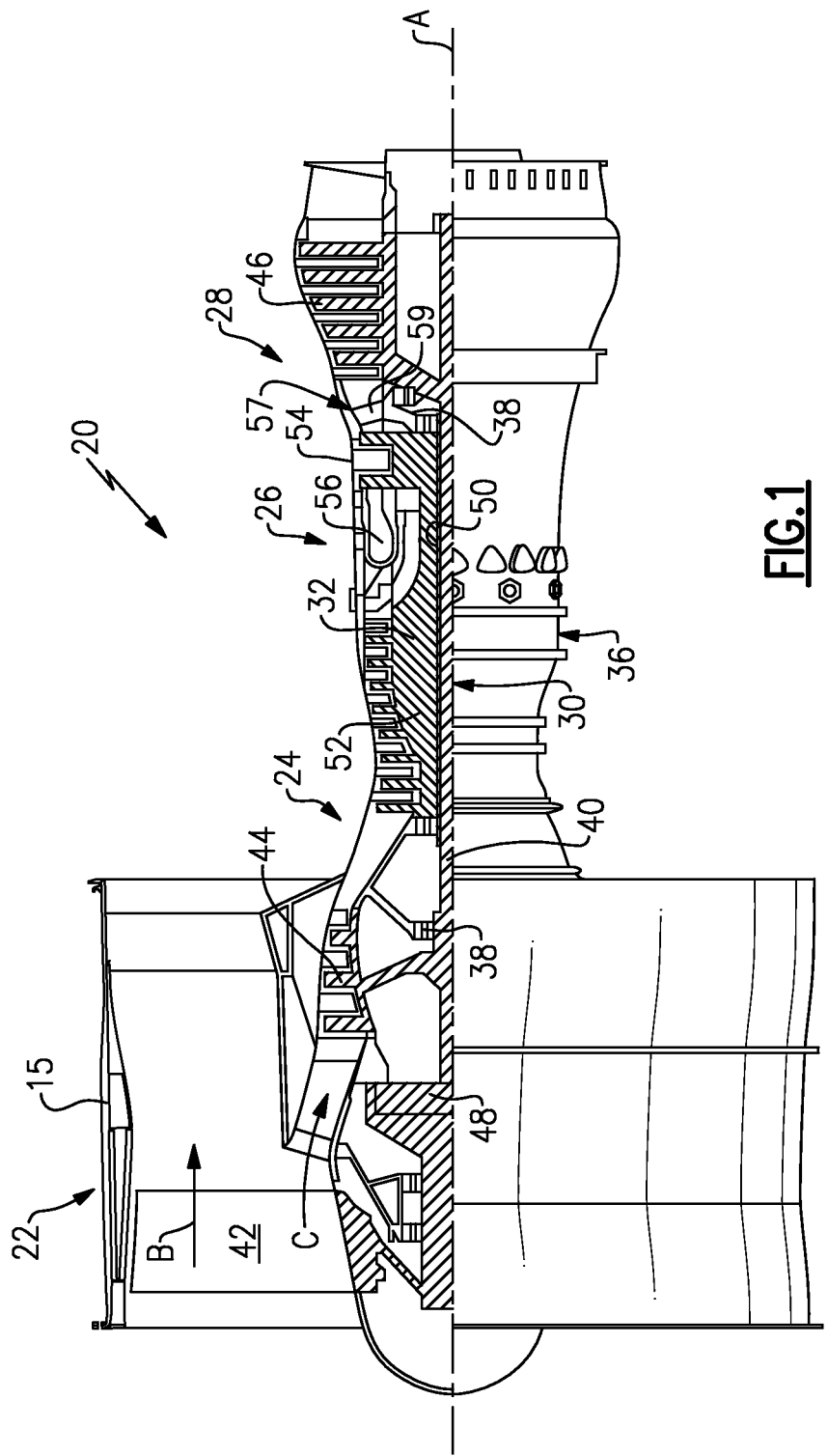
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2A:
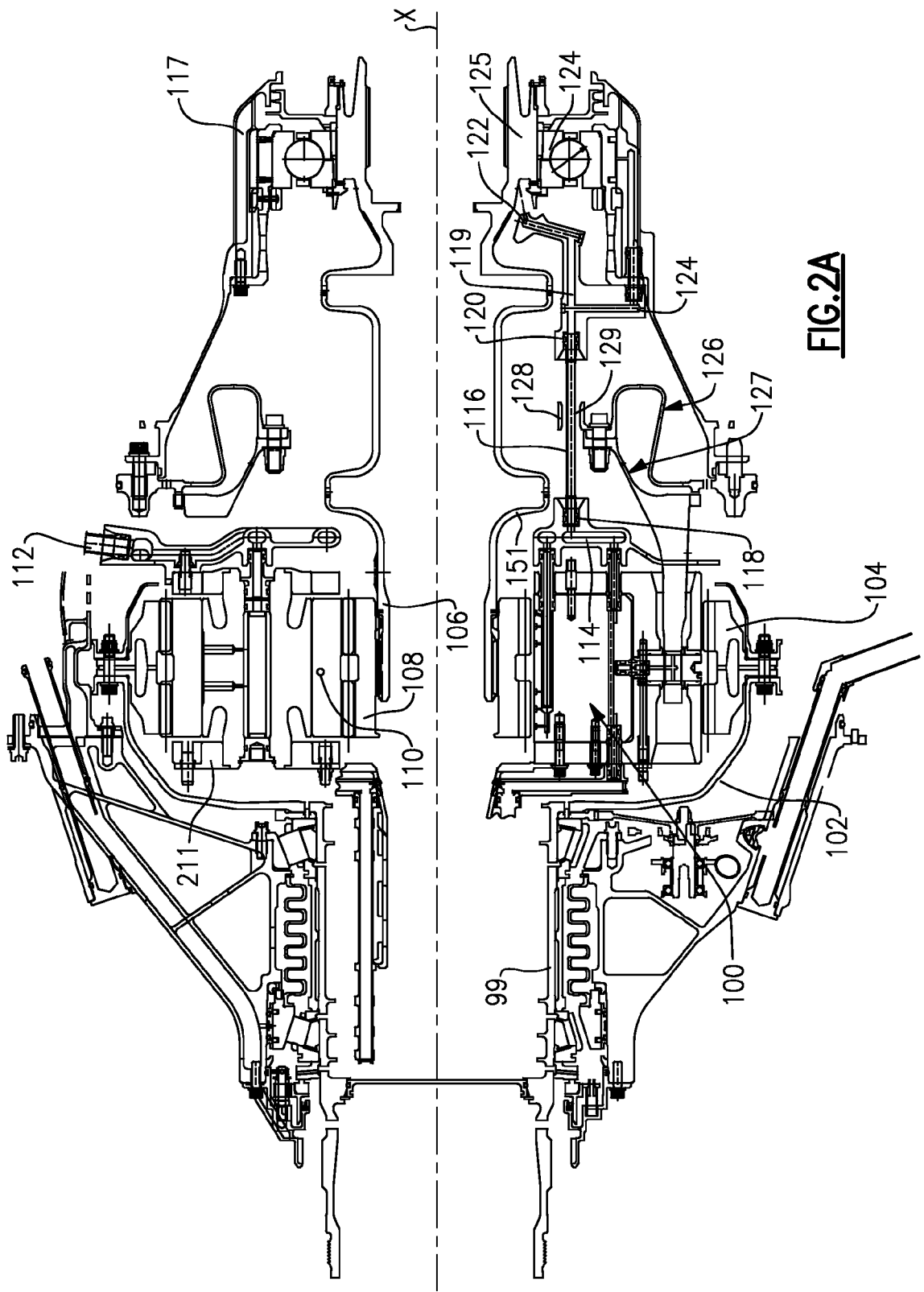
FIG. 2A shows a detail of a fully assembled gear reduction module and drive shaft.

FIG. 2A shows a particular gear reduction module 100, which may sit in the location of gear reduction 48 from FIG. 1. An outer casing 102 rotates with a ring gear 104 to drive an output shaft 99. Output shaft 99 drives a fan rotor, such as fan rotor 42 from FIG. 1.

Planet gears 110 are rotated by a sun gear 108. Sun gear 108 is driven by an input shaft 106.

The gear reduction 100 module is mounted within the gas turbine engine in a flexible manner, allowing positional adjustment. Thus, a convolute 151 is provided on the drive shaft 106, and a flexure mount (flex support 126 and the torque frame 127) is provided as a mount for a carrier housing 211 for the gear reduction module 100. The convolute 151 is part of a flexible mount for the input drive shaft 106 such that the sun gear 108 can adjust relative to a center line X of the engine. The flexure mount 126/127 allows adjustment of the carrier housing 211 relative to static structure on the engine. The housing 211 may also be referred to as static structure in this application, although the flexure mount 126/127 does allow it to move somewhat.

An oil supply 112 supplies oil into the gear reduction module 100 in a known manner.

Oil from the oil supply 112 eventually reaches a chamber 114, and communicates with an oil supply tube 116 which delivers oil into a bearing module 117. Bearing module 117 includes a bearing 124 which supports one end 125 of the input shaft 106. The bearing 124 needs lubrication also, and thus the tube delivers oil into a passage 119, and from passage 119 to outputs 122 and 124.

The tube 116 is received in an opening 120 in bearing module 117, and in an opening 118 in the carrier 211. The opening 118 could be in other static structure within the gear reduction 100.

As shown, an assembly guide 128 is attached as part of the flexure flange 126.

Figure 2B:
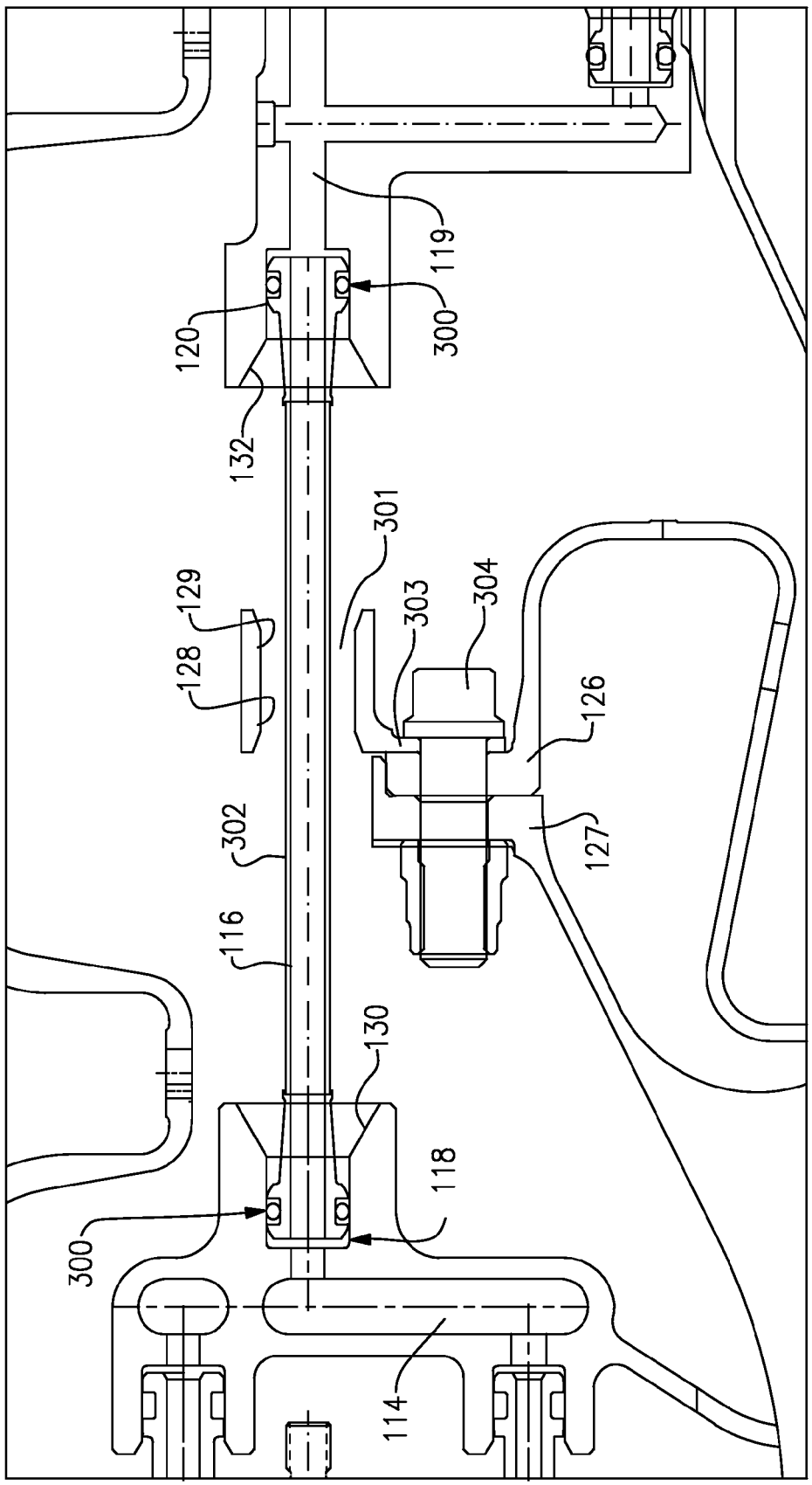
FIG. 2B shows a portion of the FIG. 2A structure.

FIG. 2B shows details of the assembly guide 128. As shown, the assembly guide 128 has an opening 129 providing a space 301 about an outer periphery 302 of the tube 116. This space will limit the amount tube 116 pivots within the opening 129 while the gear reduction module 100 is assembled to the bearing module 117. As is clear, assembly guide 128 has a flange 303 bolted at 304 to the flexure mount 126/127.

As can be appreciated from this FIG. 2B, the opening 118 receives one end of the tube 116 having resilient seals 300, and the opening 120 also receives an end of the tube 116 having seals 300. These seals 300 allow the tube to pivot within the respective openings 118 and 120 as the flexible connection allows adjustment between the bearing module 117 and gear reduction module 100. The opening 129 is axially intermediate the openings 118 and 120.

As is also clear from this figure, there are chamfers 130 and 132 leading into the respective openings 118 and 120. This will assist in this pivoting movement, and assembly, as will be described below.

Figure 3:
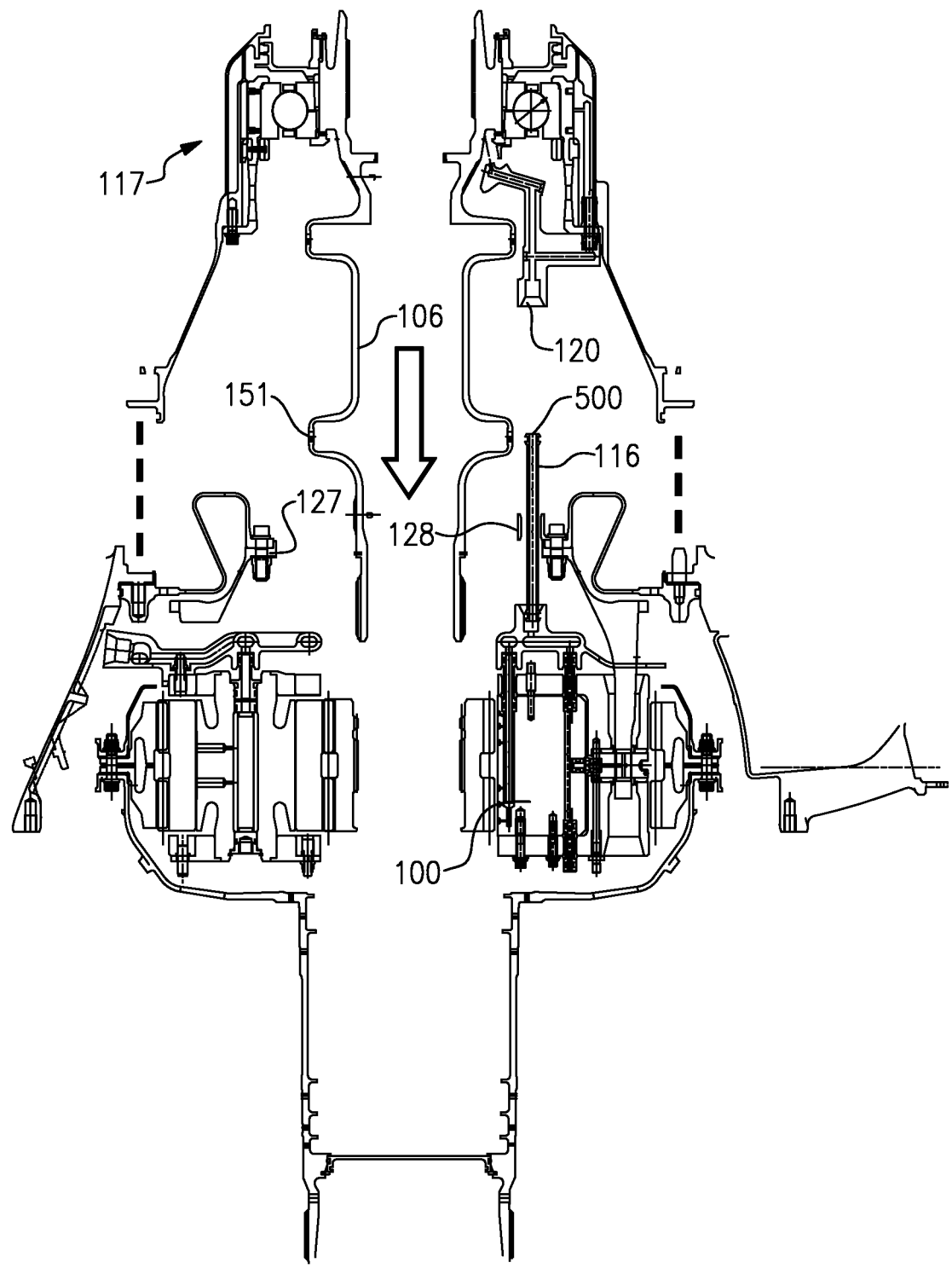
FIG. 3 shows an assembly of a gear reduction module to a bearing module.

FIG. 3 shows an assembly in an orientation where the bearing module 117 is brought vertically downwardly into the gear reduction module 100. In this position, the bearing tube 116 is positioned within the assembly guide 128. Thus, it can be assured that the tube 116 will be relatively close to a proper position to move into the opening 120. Further, the tube 116 can be assured not to interfere with the flexure mount flange 126/127 or the convolute 151. More narrowly, the size of the gap 301 is limited to ensure that an end 500 of the tube 116 will be within outer extents of the chamfer 132 in the opening 120 when the two are brought together. A worker of ordinary skill in the art would recognize the simple geometric relationships that would be utilized to ensure that this will occur. Now, even though the assembly is blind, it is relatively easy to assemble the bearing module 117 into the gear reduction 100, and still ensure that the tube 116 is properly received in the opening 120.

Figure 4:
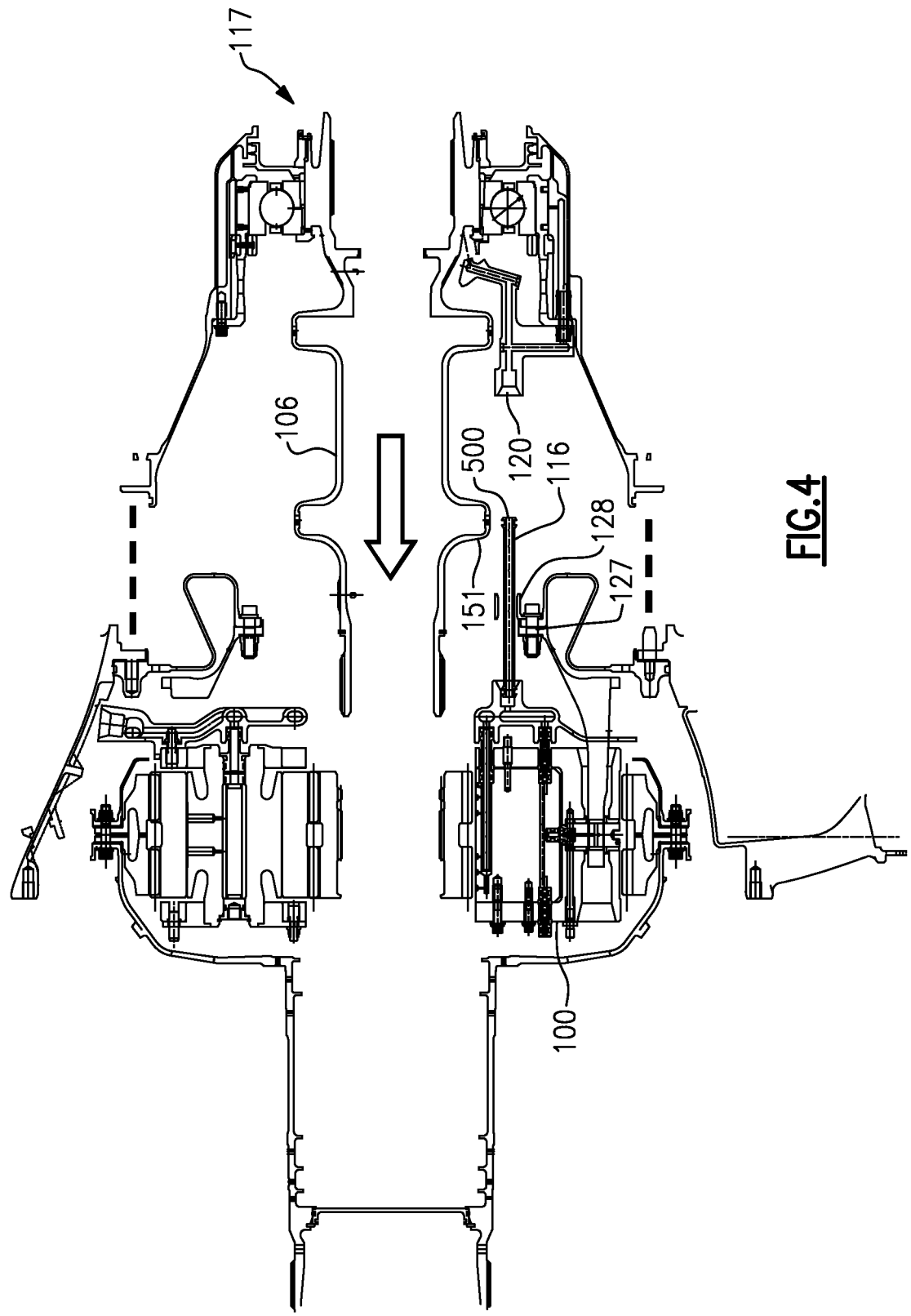
FIG. 4 shows another assembly arrangement.

FIG. 4 shows an alternative assembly direction wherein the two are brought together horizontally. Again, the opening in assembly guide 128 ensures the tube 116 is properly orientated as the two are brought together.

While the assembly guide 128 is illustrated as being initially assembled with the gear reduction 100, it should be understood that it may also be initially attached to the bearing module 117. Further, in such an embodiment, the tube would also preferably be initially associated with the bearing module 117.

After assembly, and during normal operation, the size of the gap 301 insures that the tube 116 does not contact the guide 128.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan, a turbine section including a turbine rotor to drive said fan through a gear reduction module;
   an input shaft downstream of said turbine rotor including a flexible mount driving said gear reduction module, and said input shaft being mounted within a bearing module, and said gear reduction module having static structure mounted to an engine housing through a flexible mount; and
   an oil supply system to supply oil into said gear reduction module, and an oil tube to supply oil from said gear reduction module to said bearing module, said oil tube being received within an opening in said static structure, and in an opening in a housing for said bearing module, and said oil tube extending through an assembly guide having a guide opening which is spaced away from an outer periphery of said oil tube, and said guide opening is intermediate said opening in said static structure, and said opening in said bearing housing.

2. The gas turbine engine as set forth in claim 1, wherein said assembly guide is mounted to said gear reduction module.

3. The gas turbine engine as set forth in claim 1, wherein said opening in said static structure, and said opening in said bearing housing both having a chamfer leading into said openings to allow said tube to pivot within each said opening.

4. The gas turbine engine as set forth in claim 3, wherein said tube is provided with resilient seals at an outer periphery to allow said tube to pivot within said openings in said static structure, and said bearing housing.

5. The gas turbine engine as set forth in claim 3, wherein said guide opening is sized to be spaced from said outer periphery of said oil tube by an amount which will limit any pivoting movement of said oil tube such that it will be aligned with a portion of said chamfer into one of said openings in said static structure and said bearing housing to which it is being assembled.

6. The gas turbine engine as set forth in claim 1, wherein said turbine section driving a pair of turbine rotors, and there being a pair of compressor rotors, a first compressor rotor being positioned downstream of said fan, and a second compressor rotor being positioned downstream of said first compressor rotor, a first turbine rotor being positioned downstream of a second turbine rotor, and said first turbine rotor driving said first compressor rotor, and driving said fan through said input shaft.

7. The gas turbine engine as set forth in claim 1, wherein said static structure is in a gear reduction carrier.

8. A method of assembling a gear reduction module to a bearing module comprising the steps of:
   (a) providing a gear reduction module having a gear for rotating on a central axis, and a static structure mounting said gear, said static structure being attached to an engine housing through a flexible mount, and there being an input shaft to drive said gear through a flexible mount, said input shaft being supported in a bearing module, and providing an oil supply tube from said gear reduction module to supply oil to said bearing module, said static structure and said bearing module each being provided with an opening to secure said oil tube, and providing one of said gear reduction and said bearing module with an assembly guide, said assembly guide having a guide opening which is spaced away from an outer periphery of said oil tube, but limits pivoting movement of said oil tube;

(b) inserting said oil tube into said opening in one of said static structure and said bearing module, and passing said oil tube through said guide opening; and (c) attaching said input shaft within said sun gear, and moving said oil tube into the opening in said other of said static structure and said bearing module.

9. The method as set forth in claim 8, wherein said assembly guide is mounted as part of said gear reduction module.

10. The method as set forth in claim 8, wherein said assembly guide is mounted to a flexible mount for flexibly mounting said static structure within the engine housing.

11. The method as set forth in claim 8, wherein said opening in said static structure, and said opening in said bearing housing both having a chamfer leading into said openings to allow said tube to pivot within each said opening.

12. The method as set forth in claim 11, wherein said guide opening is sized to be spaced from said outer periphery of said oil tube by an amount which will limit any pivoting movement of said oil tube such that it will be aligned with a portion of said chamfer into one of said openings in said static structure and said bearing housing after step (b) and as step (c) begins.

13. The method as set forth in claim 8, wherein said turbine section driving a pair of turbine rotors, and there being a pair of compressor rotors, a first compressor rotor being positioned downstream of said fan, and a second compressor rotor being positioned downstream of said first compressor rotor, a first turbine rotor being positioned downstream of a second turbine rotor, and said first turbine rotor driving said first compressor rotor, and driving said fan through said input shaft.

14. The method as set forth in claim 8, wherein said static structure is in a gear reduction carrier.

* * * * *